Jan. 15, 1935.　　　B. H. SMITH　　　1,987,717
THERMAL MOTOR DEVICE
Filed Feb. 6, 1932
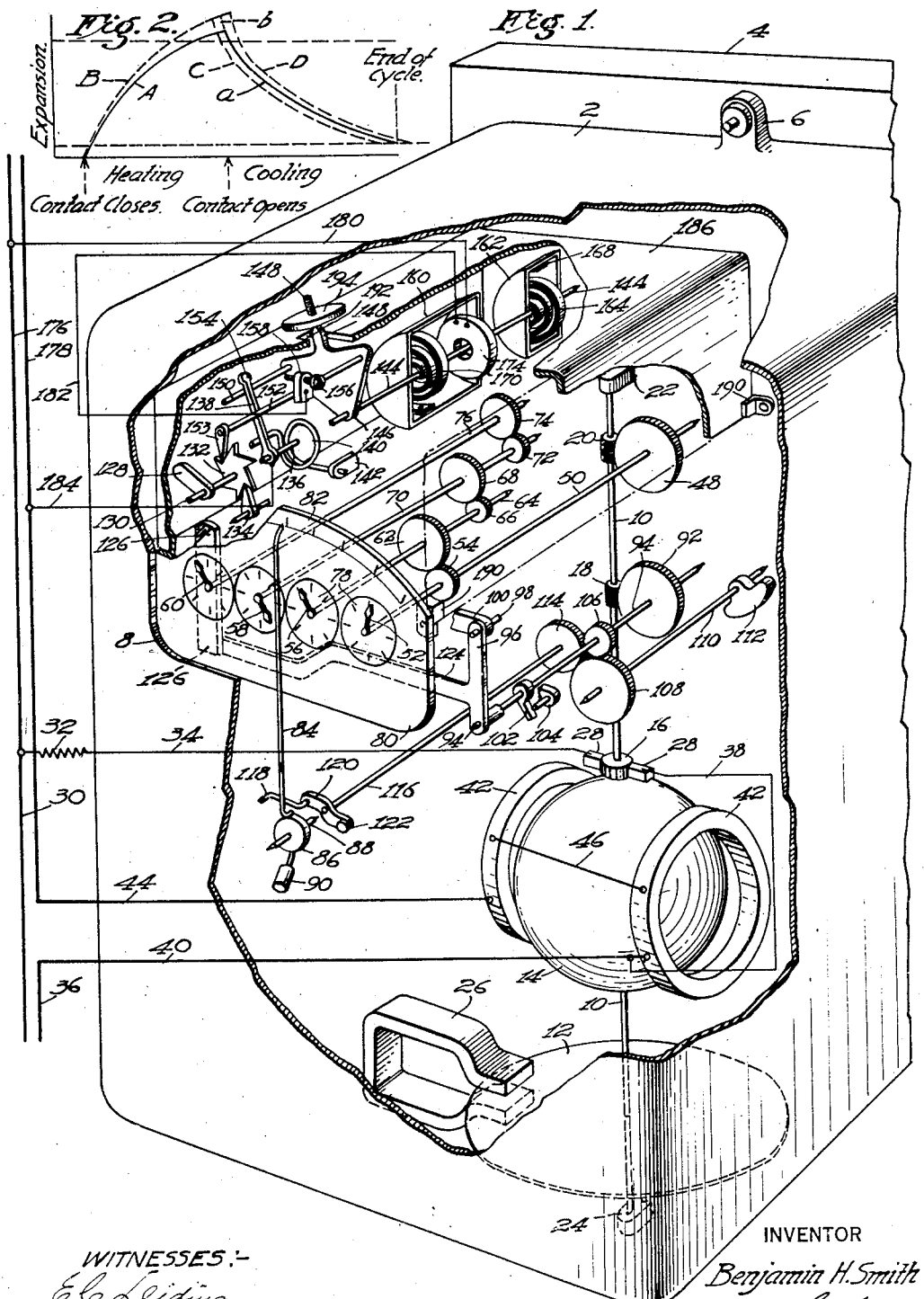
WITNESSES:-
E. C. Leiding
F. H. Miller
INVENTOR
Benjamin H. Smith
BY
Saltzman
ATTORNEY Patented Jan. 15, 1935

1,987,717

UNITED STATES PATENT OFFICE 1,987,717

THERMAL MOTOR DEVICE

Benjamin H. Smith, Bloomfield, N. J., assignor to Westinghouse Electric & Manufacturing Company, a corporation of Pennsylvania Application February 6, 1932, Serial No. 591,436

4 Claims. (Cl. 60—23)

My invention relates to thermal motor devices and particularly to timing devices, such as clocks and demand meters embodying such motors.

One object of my invention is to provide a thermal motor that shall be free from errors normally caused by ambient temperature changes.

Another object of my invention is to provide an electrical timing device that shall be independent of escapement mechanisms or action, as in ordinary spring clocks, and that shall also operate by direct as well as by alternating current.

Another object of my invention is to provide a direct-current timing motor wherein the necessity for a commutator is avoided.

Another object of my invention is to provide a unit including a direct-current timing motor and associated mechanism of such size and characteristics as to be adapted for use in a demand attachment for integrating meters.

A further object of my invention is to provide a device of the above-indicated character that shall be simple and durable in construction, economical to manufacture and effective in its operation.

Timing devices, as heretofore constructed, have in general been of two kinds, namely, that of the spring-motor type and that of the synchronous-motor type.

In the former, the well-known escapement mechanism is employed, as well as a comparatively powerful main spring which requires periodic winding.

In the synchronous motor clock, the escapement mechanism may be omitted but the motor is of the rotating-armature type in which the armature is in motion at a high rate of speed, so long as the circuit to which it is connected is alive. This intensive duty of high speed rotation practically twenty-four hours a day, year in and year out, imposes a heavy burden on the bearings and other moving parts.

By reason of the lack of requirement of winding and of the fact that modern commercial alternating-current power circuits are seldom dead, the synchronous timing motor has gained considerable popularity, both as an ordinary indicating clock and as a timing-device for demand meters, traffic signals, flash signs and the like.

There is a considerable field in connection with direct-current circuits for a timing device but, obviously, neither a spring clock nor a synchronous-motor clock is adapted for this purpose. The spring clock is precluded by its bulk and by the necessity of winding, and the synchronous motor is precluded because the available source of energy is direct-current.

A direct-current meter, of commercial design, embodies a commutator, and is, in effect, a direct-current motor. It is feasible and commercially practicable to provide a meter of the commutator type but, to provide another commutator motor for timing purposes in the same meter, which added motor should, by necessity, be smaller than the meter motor, is out of the question for commercial and other reasons.

The problem of providing an adequate timing motor for a direct-current demand meter has, therefore, been difficult.

It has been my main purpose to provide a direct-current demand-meter attachment but, in accomplishing the result sought, a motor has been devised which is not only adapted for the first intended use but is adapted for use as a demand-attachment for alternating-current meters, as a clock, as one of the above-mentioned units and as merely a motor for any of various uses.

Figure 1, of the accompanying drawing, is a composite view of the device of my invention, showing the inner mechanism in exploded perspective, the outer casing in exaggerated ordinary perspective to fit the exploded parts, and a diagram of certain circuits thereof, parts being broken away and omitted for clearness, and Fig. 2 is a diagram of the heating-cooling cycle of operation of the timing motor disclosed in Fig. 1.

Referring to Fig. 1, the outer casing comprises a cover 2 and a base plate 4 that are detachably secured to each other, as at 6.

The cover 2 may be of glass, metal or other suitable material and, if of opaque material, as illustrated, is provided with a front window 8.

The movable meter element comprises a spindle 10, on which are mounted a damping disk 12, a spherically wound armature 14, a commutator 16, a worm screw 18 and a worm screw 20.

The spindle 10 is carried by upper and lower bearings 22 and 24, respectively, constituting parts of, or secured to, a frame mounted on the base 4. The frame is, in general, omitted for clearness and only such parts, as the bearings 22 and 24, and other portions to be hereinafter mentioned, are shown as are necessary to a complete understanding of the device. For instance, a damping magnet 26, for cooperation with the disk 12, is also mounted on the aforementioned frame, in a manner not shown but obvious to those skilled in the art.

Brushes 28, also carried by the frame, to cooperate with the commutator 16, are connected, at one side to a load conductor 30 through a resistor 32 and a conductor 34, and, at the other side, to a load conductor 36 through conductors 38 and 40.

Field coils 42 are connected in series relation to each other and to the load circuit by a conductor 44, a conductor 46 and the conductor 40.

The above circuits and connections are usual and need no further explanation, so far as my invention is concerned. Obviously, the spindle 10 is rotated in one direction in accordance with the load being measured.

The worm screw 20, secured to the spindle 10, engages a worm wheel 48 carried by a shaft 50. The latter is connected to a pointer 52 of an integrating mechanism and is provided with a pinion 54 that operates pointers 56, 58 and 60 through a gear wheel 62, a shaft 64, a pinion 66, a gear wheel 68, a shaft 70, a pinion 72, a gear wheel 74 and a shaft 76.

The shafts 50, 64, 70 and 76 are all supported in stationary bearings of the above-mentioned frame.

The pointers 52, 56, 58 and 60 cooperate with corresponding scales represented by circular marks 78 on an index card or plate 80 behind the window 8, to indicate the total energy consumption.

The card 80 is further provided with a demand scale 82 for cooperation with a pointer 84 that is mounted on a hub 86 secured to a shaft 88 and carries a balance weight 90. The shaft 88 is frictionally mounted to maintain the pointer 84 in any position to which it may be moved.

Reverting to the meter spindle 10, the worm screw 18 thereon engages a worm wheel 92 on a shaft 94 that is journaled in, and carried by, a lever arm 96, the latter being pivotally mounted, by a pin 98, to a stationary bearing portion 100 of the meter frame.

The shaft 94 also carries a dog 102 for engagement with a stationary pin 104, and a pinion 106 engaging a gear wheel 108. The latter is mounted on a shaft 110 that carries a weight element 112 and is mounted in the meter frame.

The gear wheel 108 engages a pinion or wheel 114 on a shaft 116 that is also mounted on the frame and carries an element 118 for pushing the pointer 84.

The element 118 may comprise, as shown, a wire portion, bent to have a portion in the path of the pointer 84 and a sheet-metal portion 120 secured to the shaft 116 and carrying a balance-weight 122.

The lever arm 96 has a side arm 124 on which is mounted a dog 126, preferably of insulating material.

An arm 128, for engagement with the dog 126, is carried by a shaft 130 that is journaled in the meter frame and carries a ratchet 132. A pawl 134, journaled in a bearing carried by the frame, engages the ratchet 132 to prevent reverse, or clockwise, movement of the ratchet 132, as viewed in the drawing.

A shaft 136, in alignment with the shaft 130, carries a switch arm 138 that is biased in the clockwise direction, by a spring 140 secured to a portion 142 of the frame.

A shaft 144, in alignment with the shafts 130 and 136, carries a member 146 rigid therewith having a radial arm 148 and supporting pins 150 and 152 parallel to the shaft at opposite sides of the switch arm 138. The latter has a contact portion 154 for engagement with an adjustable stationary contact screw 156 mounted in a stationary portion 158 of the meter frame. Also, the pin 152 carries a pawl 153 for advancing the ratchet 132.

Stationary cylindrical casings 160 and 162 are secured to the meter frame and surround the shaft 144.

A bimetallic spiral element or spring 164, in the casing 162, surrounds the shaft 144 to which it is suitably secured at its inner end. The outer end 168 is suitably secured to the casing 162.

A bimetallic spiral element 170, in the casing 160, extends about the shaft 144 in opposite direction to that in which the spring 164 extends and is secured, at its inner end, to the shaft and, at its outer end, to the casing 160.

A heater coil 174 for the spring 170 is disposed in stationary position about the shaft 144 in the casing 160 next to the spring 170 and is connected across supply-line conductors 176 and 178, and in series relation to the contact members 154 and 156, by conductors 180, 182 and 184.

An auxiliary cover 186, removably resting on supports 190 secured to stationary parts of the structure, is provided over the bimetallic springs 164 and 170, and appurtenant parts.

A slot 192, through which the arm 148 extends, is provided in the top wall of the auxiliary cover 186 to permit adjustment of a balance nut 194 on the arm 148, when the main meter cover 2 is removed.

In operation, the worm screw 20 constantly remains in engagement with the gear wheel 48 to actuate the total consumption register represented by the scales 78 and associated pointers. However, the element 118, which pushes the maximum demand pointer 84, is returned to an initial or zero position at the ends of equal periods of time, such as fifteen minutes, as follows:

The bimetallic spirals 164 and 170, being differentially connected to the shaft 144, the effect of ambient temperature is thereby compensated so that no error is caused hereby.

However, the coil or heater 174, in the casing 160, is periodically energized to heat the bimetallic spring 170 which is thereby expanded, or uncoiled, to move the shaft 144 in the counterclockwise direction.

As illustrated, the spiral spring 170 has just gone through a heating cycle to thus move the shaft 144, in doing which, it has moved the element 146 to the left.

In moving from right to left, the element 146, when it passes over the axis of the shaft 144, is then carried by the weight nut 194 for the remainder of its swing. This movement, at first, moves the pin 150 away from the switch arm 138 which is still held in closed position by the spring 140.

When the element 146 passes over the axis of the shaft 144 to complete its swing, the pin 152, which to that time has been spaced to the right of the switch arm, then suddenly engages the arm to effect a quick break of the switch. At the same time, the pawl 153 on the pin 152 advances the ratchet 132 forward one notch, or one sixth of a revolution, as shown.

The circuit of the heater 174, being thus broken, the spiral spring 170 starts its cooling cycle which, by contraction of the spiral spring 170 reverses the motion of the element 146.

During this reverse motion, the element 146 again operates with a quick action, over its vertical or central position, to close the switch represented by the contact portions 154 and 156, and the pawl 153 is moved back one position to engage a succeeding notch of the ratchet 132. The circuit of the heater 174 is thus closed to initiate another heating cycle and to repeat the operation in the forward direction.

At the end of each sixth heating cycle, the ratchet 132 reaches the end of a three hundred and sixty degree turn to cause the arm 128 to engage and depress the dog 126.

This action turns the lever arms 124 and 96 in the counterclockwise direction about the pivot pin 98 to disengage the worm wheel 92 from the worm screw 18, the pinion 106 remaining in mesh with the gear wheel 108 during the slight movement which the shaft 94 is caused to make. As soon as the arm 128 passes the dog 126, the latter is returned to its initial position under the influence of the weight of the displaced gears 106 and 92.

While the worm screw 18 and the wheel 92 are in engagement, the pinion 106 turns the gear wheel 108 and, consequently, the shaft 110 and the weight element 112, in the counterclockwise direction. At the same time, the gear wheel 108 turns the wheel 114, the shaft 116 and the element 118 in the clockwise direction.

At the beginning of a relatively long time interval, such as a month, the maximum pointer 84 is set, with the element 118, at a zero or initial position to the left, as viewed in the drawing. Thus, when the worm screw 18 and the worm wheel 92 are engaged for a short period, such as fifteen minutes, the pointer 84 will advance as far as it is moved by the element 118 during that period.

During subsequent fifteen minute periods, the pointer may or may not be further advanced, depending on the load.

The parts are designed so that the weight element 112 never travels upwardly as much as 180 degrees in the counterclockwise direction, so that, when the worm screw 18 and the worm wheel 92 are disengaged, the weight element is in position to move the shaft 110 and the gear wheel 108 in the clockwise direction. This action causes the arm 102 to engage the stop pin 104 and the element 118 to reach the initial position thereof at the same time.

By proper selection of the sizes, kinds and relations of materials, the heating and cooling cycles of the spiral spring 170 may be of relatively great accuracy as to time, to further which end, the casings 160 and 162, and the auxiliary cover 136, are provided.

Theoretically, if the spirals 164 and 170 are duplicates and subject to no other influence, the ambient temperature in still air should perfectly cancel out, in the operation thereof. That is, there should be no movement of the shaft 144, even with sudden changes in ambient temperature which affect the parts equally.

However, there are other parts associated with the shaft 144 which in themselves may be affected by ambient temperature changes, or local zone temperature variations caused by air currents and may react on the spiral springs, to offset which the cover 186 is provided.

Thus, with the casings 160 and 162 and the cover 186, the parts are lagged against temperature changes and the effect of local air currents so that, when the main meter cover 2 is removed, sudden changes in ambient temperature are prevented and the effect of air currents is reduced to a minimum.

The cover 2 is seldom out of position for any considerable period but the device operates substantially the same with the cover off as it does with it on.

As illustrated in Fig. 2, a heating half-cycle is indicated by a solid-line curve A and the corresponding cooling half-cycle by the solid-line curve a. With an over-voltage, these curves are modified, as indicated by broken line curve B—b in which curve b is coincident with curve a. Curves C and D illustrate the effect of under-lagging and over-lagging, respectively, on the cooling half-cycle. The diagram, as a whole, shows the sharp degree of accuracy which may be obtained.

A great advantage of my invention over a synchronous motor clock or timing device resides in the reduction in friction between parts. Whereas, synchronous motors operate at speeds of as high as thirty-six hundred revolutions per minute, the moving parts of my invention, aside from the slow expansion and contraction of the spiral springs, are in motion for almost negligible periods of time.

Further, the device of my invention has been produced in a size, and at a cost, favorably comparable to the synchronous clock moters employed only on alternating current circuits, and it operates, not only on direct current, but on any commercial frequency of alternating current as well.

The device has other advantages and possible uses and is, in general, a substantial advancement in the meter, chromometer, signal and similar arts, or in the time keeping art in general.

While I have shown and described a particular form of my invention, changes may be effected therein without departing from the spirit and scope thereof as set forth in the appended claims.

I claim as my invention:

1. In combination in a thermal motor, a shaft, a first bimetallic spiral strip having the inner end thereof secured to said shaft and the other end anchored to a stationary object, a heating resistor adjacent thereto, a switch member connected to said shaft for alternative actuation to open and closed positions to control the periodic heating of said resistor in accordance with the consequent expansion and contraction of said spiral strip, a second bimetallic spiral strip similar to said first spiral strip mounted on said shaft in opposing relation with its inner end secured thereto and its outer end anchored on a stationary object, a casing enclosing said first spiral strip and its adjacent heating resistor, a separate casing enclosing said second spiral strip whereby the temperature responsive parts are lagged against temperature changes and the effect of local air currents, and a member actuated by said shaft.

2. In combination in a thermal motor, a shaft, a device to be controlled thereby, a bimetallic spiral strip having the inner end thereof secured to said shaft and the other end anchored to a stationary object, a heating resistor adjacent thereto, and a switch member connected to said shaft for alternative actuation to open and closed positions to control the periodic heating of said resistor in accordance with the consequent expansion and contraction of said spiral strip.

3. In combination, a shaft, temperature responsive means to cause forward and reverse movement thereof, a heating resistor adjacent thereto, a temperature lagging casing enclosing said means and resistor, a second temperature responsive means similar to the first and associated with said shaft for opposing reaction thereon, and a separate temperature lagging casing enclosing said second temperature responsive means.

4. In a thermal motor timing device, the combination of a heating resistor, a first temperature responsive element adjacent thereto, a member actuable thereby, a second temperature responsive element reacting in opposing relation on said member, a temperature lagging casing enclosing said heating resistor and associated element, a second temperature lagging casing enclosing said second temperature responsive element, and an auxiliary cover enclosing both of said temperature lagging casings.

BENJAMIN H. SMITH.